June 30, 1925.

B. E. FISCHER 1,543,761

DEVICE FOR KILLING RATS, MICE, OR OTHER RODENTS

Filed July 14, 1924     2 Sheets-Sheet 1

Bernhard E. Fischer
INVENTOR

WITNESSES

BY

ATTORNEY

June 30, 1925.  
B. E. FISCHER  
1,543,761  
DEVICE FOR KILLING RATS, MICE, OR OTHER RODENTS  
Filed July 14, 1924  2 Sheets-Sheet 2
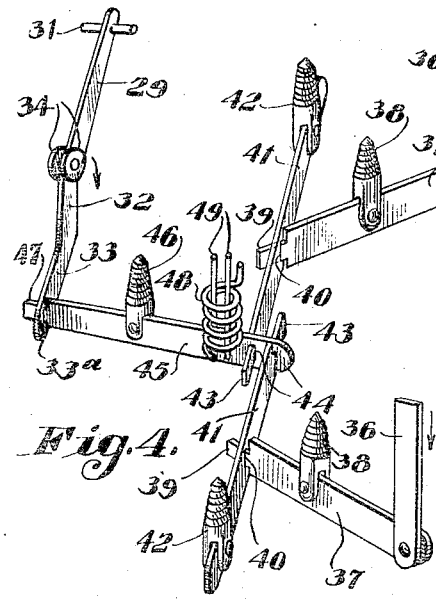
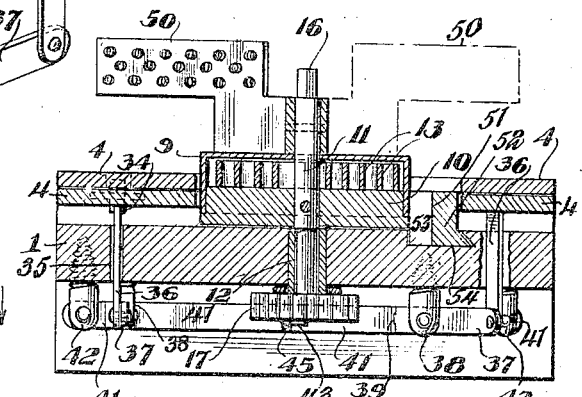
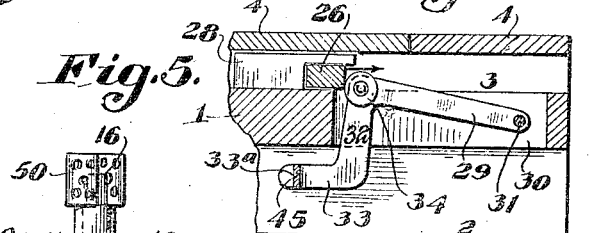
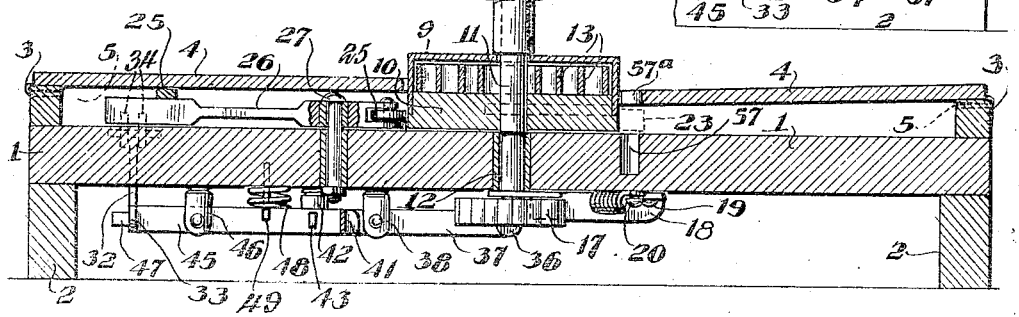
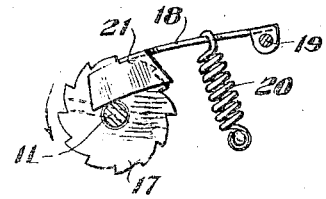
Bernhard E. Fischer  
INVENTOR
WITNESSES  
Louis Goodman  
Howard D. Orr.
BY  
ATTORNEY Patented June 30, 1925.

1,543,761

UNITED STATES PATENT OFFICE.

BERNHARD ERNST FISCHER, OF OMAHA, NEBRASKA.

DEVICE FOR KILLING RATS, MICE, OR OTHER RODENTS.

Application filed July 14, 1924. Serial No. 725,989.

*To all whom it may concern:*

Be it known that I, BERNHARD E. FISCHER, a citizen of the United States, residing at Omaha, in the county of Douglas and State of Nebraska, have invented new and useful Improvements in Devices for Killing Rats, Mice, or Other Rodents, of which the following is a specification.

This invention relates to devices for killing rats, mice or other rodents.

The object is to provide a device adapted to be placed in position in a runway or other place frequented by the pests so as to cause the same to walk over the device and to release, simply by the weight of the animal, certain tripping mechanism, which permits the killing means to deliver a swift and powerful blow that immediately kills, no matter what part of the device the animal may have trod upon.

Another object is to provide a device of this character wherein the only exposed parts of the mechanism is that part which delivers the death blow, the same being in the form of revolving wings extending above and reaching across an upper, covering and actuating platform, in proper position at the center of the device to strike the animal on the head, no matter from which direction it may come.

A further object is to provide a killing device which, when tripped or released by the weight of the animal, will not only kill the same, but will knock or sweep the same clear of the actuating platform of the device, so that the same may be free to administer the same treatment to other animals that may follow.

A final object is to provide a strong and durable device of this class which, by giving the spring actuated mechanism an initial winding, will cause the death of a great number of animals, as the said mechanism is so arranged as to cause only one-half a revolution of the killing members at each operation in a direction to allow the said spring to unwind only a slight fraction, the device being, for this reason, capable of being properly baited and set away in the desired location to take care of itself and do its work without requiring any attention.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 3 is a vertical, transverse section through the device, taken on the line 3—3 of Figure 2.

Figure 4 is a perspective view of a portion of the mechanism detached from the frame of the device.

Figure 5 is a vertical, longitudinal section of the same.

Figure 6 is a detail view of the ratchet and pawl for holding the actuating spring.

Figure 7 is a detail sectional view taken on the line 7—7 of Figure 2.

Figure 8 is a detail sectional view taken on the line 8—8 of Figure 2.

Figure 1:
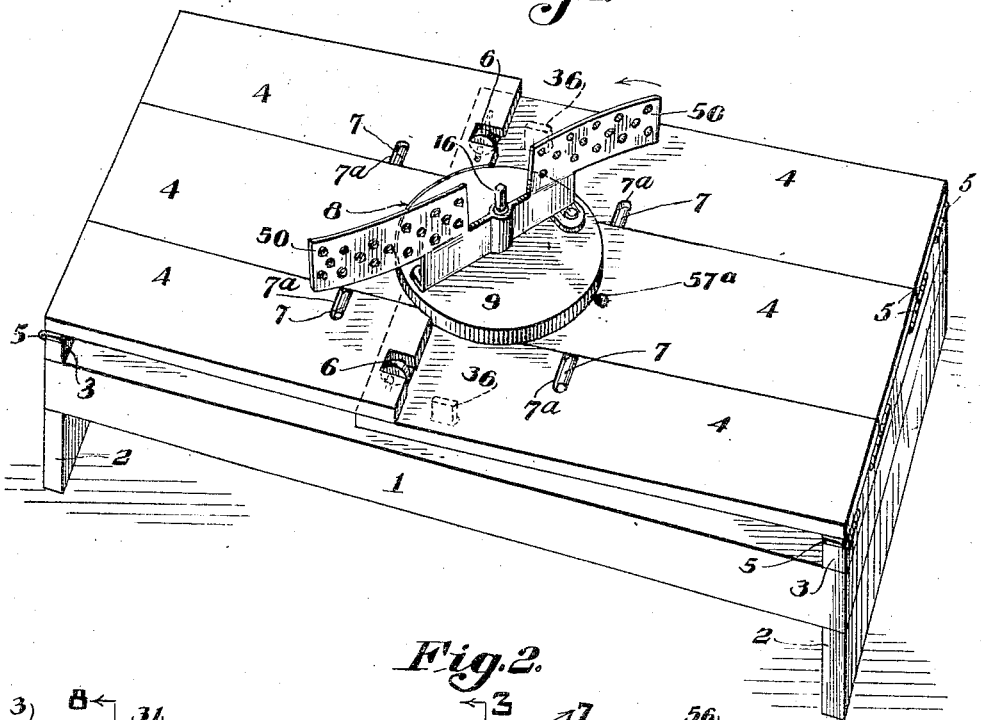
Figure 1 is a perspective view of the improved killing device.

The invention comprises a base or frame adapted to rest upon the floor or other support, and to house or partially house certain mechanism in spaced relation to the support, so that the said mechanism may be freely actuated to kill the animals, and not beclogged or otherwise interfered with by the same.

The frame comprises a base board 1 which may be formed of suitable wood or of metal, and it is to be understood that the entire device may be formed of metal, or partly of metal and partly of wood, as illustrated in the drawings.

The base board 1, which may be of any desired rectangular form, is preferably oblong in shape, the ends of the board having suitable transverse cleats 2 secured beneath the same to form supports for holding the said board above the floor or other surface, in order to provide room beneath the base board for certain of the mechanism to be described.

The ends of the board or base 1 is further provided on its upper face with transverse strips 3, flush with the end edges thereof and extending from front to rear thereof, the said strips being suitably secured in position and being of less height than the height of the aforesaid cleats 2.

The outer ends of rectangular platform sections 4 are pivotally connected to the strips 3 by hinges 5, in a manner to allow the inner ends of said sections to move up and down, and the same are arranged close together, as shown in Figure 1, to prevent an animal's foot from being caught between the same, and at the same time to freely move independently of each other. The sections are preferably one-third the width of the base 1, and consequently extend from side to side thereof, and the three sections on one end are preferably somewhat longer than the three sections at the other end of the base. The outermost sections of the shorter set are provided with anti-friction rolls 6, which are adapted to bear upon the free ends of the outermost sections of the longer set. The two intermediate sections of both sets are each provided with outwardly extending pins 7, suitably secured to the same and bearing in grooves 7$^a$ formed, in the top surfaces of the two adjoining sections, so that any downward movement imparted to any one of the longer sections 4, will be also imparted to the other two members or sections of that set, and a like movement of the shorter sections will likewise be imparted to the longer sections.

The inner, overlapping ends of the intermediate members or sections of each set are cut to form substantially semi-circular openings 8 which, together, form a passageway for an inverted drum or turret 9 of circular form, and having a closed top wall formed of thin metal and provided with a marginal flange extending through the platform and suitably connected to a removable bottom 10, the said turret being mounted to freely rotate upon an upstanding arbor 11, having a suitable shouldered bearing in a sleeve or bushing 12 passing through the base 1 at a central point. The bottom 10 rests upon the base 1, and within the turret there is mounted a spiral spring 13 having one end connected to the arbor, as at 14, and the outer end of said spring is secured to a post 15 carried by the bottom 10, as clearly shown in Figure 2 of the drawings.

The upper end of the arbor is squared, as at 16, for the reception of a suitable key for putting the spring under tension, and the lower end of the same, where extending below the aforesaid bushing 12, carries a ratchet wheel 17, which is in engagement by a pawl or dog 18, pivotally mounted on the under side of the base 1, as at 19, and connected to one end of a pull spring 20 for holding the same in said engagement with the ratchet wheel, the inner end of the pawl having an extension 21 to bear against the arbor 11 to assist the free end of the pawl in resisting the pressure of the spring 20.

In order to hold the outer end of the spiral spring 13 against rotary movement, during the process of winding up the same and during which time the arbor is being turned, the bottom 10 of the turret is provided with a pair of diametrically opposite lugs 22 extending outwardly therefrom and provided with a radial face 23 and a curved, cam face 24. The radial face of one of the lugs is adapted to bear against a roller 25 carried at the inner end of a stopping lever 26, pivotally mounted near the said roller on the upper face of the base 1, as shown at 27. The outer end of the lever being held against swinging movement by means to be described, it follows that the bottom 10, the turret and consequently the outer end of the spring are held so that the spring may be fully wound up, the ratchet taking care of the inner end of the spring.

The long arm of the stopping lever 26, extending from the pivot 27 to the outer free end thereof is adapted to slide under and be held by a keeper 28, which prevents any movement of the lever away from the base 1 and serves to stop the swinging movement of the same, in one direction. In order to prevent the stopping lever 26 from swinging in the opposite direction, under the pressure of the lug 22, actuated by the spiral spring 13, a latch 29 is provided which is adapted to be moved up and down to hold or release the long arm of the lever 26. The latch 29 is arranged at right angles to the lever 26, when the latter is held beneath the keeper 28 and transversely of the base board 1, the latter being provided with a slot 30 extending through the same for the purpose. The latch comprises an angularly bent lever having outstanding pintle pins 31 at one end, which are countersunk or otherwise seated in the outer end of the slot 30 adjacent to the edge of the said base, the said pins acting as a fulcrum for the latch lever. Intermediate of the ends, the latch lever is provided with a downwardly extending arm 32 extending to a point beneath the base board, and there provided with an extension 33 having a slot 33$^a$ in the end thereof. The main portion of the latch lever 29, from the pivots 31 to the angular bend is located in the slot 30 and normally extends slightly upward, as shown in Figure 8 of the drawing, and is provided with a pair of anti-friction rollers 34 to engage with the free end of the stopping lever 26 where the latter extends beyond the keeper 28.

The base 1 is provided adjacent to its longitudinal side edges with a pair of slots 35, arranged in line with the central arbor 11, and mounted in said slots for up and down movement, is a pair of plungers 36, the upper ends of which are adapted to bear against the under faces of the outermost, longer platform sections 4 and to normally hold the entire series of said sections in elevated position by means of the aforesaid pins 7.

Each plunger 36 is pivotally connected at its lower end to one terminal of an angularly disposed lever 37, arranged a sufficient distance below the base to allow of the necessary swinging movement thereof, and supported, intermediate of their ends, in bifurcated posts 38 screwed into or otherwise secured to the under face of the said base. The levers 37 are provided at their opposite ends with reduced tongues 39 which loosely traverse slots 40 of secondary levers 41, arranged transversely of the base 1 and having their inner ends located at the longitudinal center line of said base. The outer ends of the secondary levers 41, beyond the slots 40, are pivotally mounted in the lower bifurcated ends of posts 42, likewise secured in the under face of the base 1, and the inner ends are reduced to form tongues 43 in overlapping relation to each other.

The tongues 43 of the secondary levers 41 are adapted to loosely fit through spaced slots 44, formed in the inner end of a latch actuating lever 45 arranged beneath the longitudinal center line of the base and in spaced relation to the same, as are the aforesaid levers 37 and 41. Intermediate of its ends, the lever 45 is fulcrumed in the post 46, and the outer end of the same is formed into a reduced tongue 47 which loosely fits in the aforesaid slot 33ª in the lower, inner end of the latch member.

In order to maintain the latch lever 29 in elevated position, so that the rollers 34 will engage and hold the stopping lever 26 in proper position to prevent the turret from turning, a coiled spring 48 is interposed between the inner end of the lever 45 and the lower face of the base, said spring surrounding a pair of guide rods 49 secured to and depending from the under face of the base and straddling the said lever, so as to serve as a guide for the latter and to prevent the spring from becoming dislodged, all of which is clearly shown in Figure 4 of the drawings. There is ample space in the several slots, where traversed by the several tongues to permit of the independent rocking movements of the several levers.

When the platform is depressed, as when a rat or other rodent steps upon any one of the sections thereof, the plungers 36 are forced downwardly, thus rocking the angularly disposed levers 37 which, in turn, act to pull upwardly upon the inner ends of the transversely disposed secondary levers 41, and this elevates the inner end of the lever 45 against the pressure of the spring 48.

Figure 2:
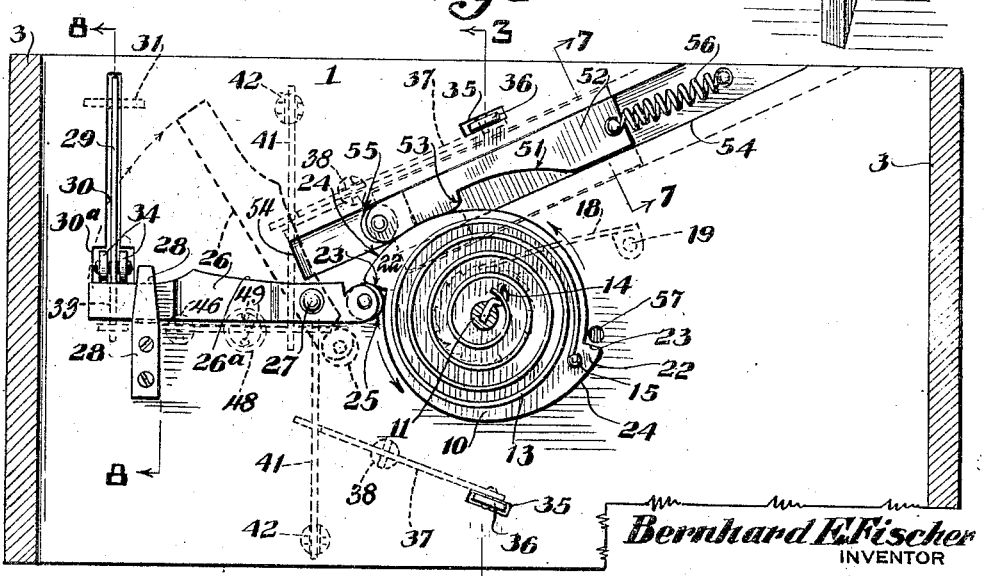
Figure 2 is a horizontal sectional view taken below the actuating platform.

The outer end of the lever 45 now depresses the latch lever 29, thus withdrawing the rollers 34 from contact with the stopping lever 29, and the said stopping lever is swung to the position indicated in dotted lines in Figure 2 of the drawing, through the pressure of the lug 22 of the rotary turret, upon the short arm thereof. During this movement, the long arm of the lever 26 passes in an arc over the rollers 34, which are now depressed into location within an enlargement 30ª of the aforesaid slot 30, and the moment the platform is relieved of the weight of the animal, in a manner to be explained, the aforesaid coiled spring 48 returns the latch lever, together with the other levers, plungers, etc. to normal position, the platform sections being also elevated thereby, and the rollers 34 being positioned again in the path of the swinging lever 26 which, when again swung about its pivot 27, by means to be explained, will ride over the rollers 34, depressing the same and gaining a position beneath the keeper, with the said rollers again holding the lever therein.

Mounted on top of the turret 9 are a pair of outwardly extending, radially disposed wings 50, which may be secured in position in any desired manner to provide sufficient strength and rigidity to withstand the force of the impact with the animal, the said wings being preferably curved slightly in a direction to present a convex surface to the striking side, the direction of movement of said wings, under the action of the spiral spring 13 within the turret, being indicated in Figures 1 and 2 of the drawings. The wings are preferably perforated to reduce the atmospheric resistance during their rotary movement, and they extend sufficiently out over the sections of the platform to strike a rat or other rodent in the head, no matter from what direction he may approach and no matter how much of the body may be mounted on the platform.

Bait, preferably in the form of some pasty substance which will not be easily dislodged by the rotary movement, may be placed on the turret or elsewhere.

When the stopping lever 26 has been swung as described, and the rotary turret starts to revolve to strike the animal, the opposite lug 22 of the turret bottom will enter into an arcuate recess 51 formed in the side of a slidable resetting bar 52, and engage with a shoulder 53 to slide the said bar longitudinally in a dove-tailed groove or seat 54 formed in the upper face of the base 1, and move the same in a direction toward the stopping lever 26, which now is in the position indicated in dotted lines in Figure 2 of the drawings, the said groove or seat being arranged on an angle for this purpose.

The inner end of the slidable bar 52 carries a roller 55 in position to contact with the curved track 26ᵃ formed in the side of the stopping bar, and which facilitates the return or resetting of the said stopping bar, which is then held by the latch rollers 34 and the roller 23 is encountered by the same lug 22, which rolls or rocks out of the recess 51 of the sliding bar 52, and the latter is immediately retracted or returned to normal position by a coiled spring 56, having one end connected to the opposite or outer end of the bar and the other end to a suitable post in the outer end of the seat 54.

The turret is thus permitted to rotate only a half revolution, which by reason of the rapidity of the action of the parts and the strength of the spiral spring, is sufficient to kill all ordinary rats or other rodents, and the force of the blow will knock or sweep the body away from the platform to permit the device to act upon other rodents. With one winding of the spiral spring, numerous rodents may be destroyed and the bait will remain indefinitely, as the animal does not have the chance to attack the same before the platform, which may be made very sensitive, feels the weight, and through the plungers, releases the parts to deliver the blow. A hole 57, formed in the base 1, is adapted to receive a pin to bear against the adjacent lug 22 and prevent accidental rotation of the turret while baiting the device, the center section 4 above having a corresponding hole 57ᵃ to permit said pin to be so placed.

From the foregoing it will be seen that a device for killing rats, or other rodents, has been provided, which requires no special attention except for the occasional winding and baiting, and that the same may be left in the proper location or position to automatically kill a large number, the resetting means automatically checking the killing means at every half revolution, so that there is no wastage of the power stored in the spiral spring.

What is claimed is:—

1. A rat killing device comprising a base frame, a series of depressible sections hinged at their outer ends and constituting a flexible platform covering the entire frame and depressible at the central portion thereof, a revoluble turret mounted on the base, wings mounted on the turret and extending radially over the platform, and means connected to the turret for revolving the same.

2. A rat killing device comprising a base frame, a depressible platform superimposed above said frame, a centrally disposed, intermittently revolving turret extending through the platform, impact wings carried by the turret, spring means connected to the turret for revolving the same, means for stopping the turret at half revolutions, separate means for releasing said stopping means to allow the turret to revolve, and separate means engaged by the turret for resetting the stopping means to again stop the turret.

3. A rat killing device comprising a base frame, a flexible platform arranged above the base frame, a revoluble turret mounted on the base and extending through the platform, rat-impacting wings mounted on the turret and extending radially over the platform, a spiral spring mounted in the turret for rotating the same, a lever mounted within the frame to coact with the turret and stop the same at half revolutions, a latch coacting with the lever to hold the same in stopping position, and means connecting the flexible platform to said latch to move the latter and release the stopping lever.

4. A rat killing device comprising a base frame, a flexible platform arranged above the base frame and comprising a series of depressible sections, a revoluble turret mounted on the base and extending through the platform, rat-impacting wings mounted on the turret and extending radially over the platform, a spiral spring mounted in the turret for rotating the same, a lever mounted within the frame to coact with the turret and stop the same at half revolutions, a latch coacting with the lever to hold the same in stopping position, means connecting the flexible platform to said latch to move the latter and release the stopping lever, and a slidable bar mounted in the frame and having means operable by the turret to cause the resetting of the stopping bar.

5. A rat killing device comprising a rectangular base frame, a series of superimposed, separate sections hinged at their outer ends to the frame ends and constituting a flexible platform covering the entire frame and depressible at the central portion under the weight of a rat, a central rotary turret extending upwardly through said sections and supported in the frame, outstanding rat killing wings mounted on top of the turret to sweep the platform, spring means for causing a constant pressure on the turret in one direction, said turret having two diametrically opposite lugs, a rockable lever intermediately pivoted in the frame, one end of said lever engaging one of said lugs to stop the turret every half revolution, a depressible latch abutting the other end of the rockable lever, vertically movable plungers mounted in the frame and adapted to be depressed by the inner ends of the platform sections, and means connecting the plungers to the latch to depress the latter and release the stopping lever under pressure by the rotary turret.

6. A rat killing device comprising a frame, a series of separate platform sections hinged at their outer ends to the ends of the frame, the inner ends of the sections at one side overlapping the inner ends of the others and the outermost, overlapping ends having anti-friction rollers to bear upon the inner ends of the corresponding sections, pins carried by the intermediate sections on each end and adjacent to their inner ends, said pins bearing upon the adjacent outer sections to cause the release of the rat killing device when a rat is on any one of the sections, a turret mounted on the frame and having rat killing wings to sweep the platform, and means for rotating the turret when the platform is depressed.

7. A rat killing device comprising a frame, a depressible platform mounted above the frame, a turret rotatably mounted on the frame and extending through the center of the platform, rat-killing wings carried by the turret above the platform, a spiral spring mounted within the turret so as to cause the same to rotate in one direction, said spring being wound around and secured to an arbor, a ratchet and pawl for holding the arbor, opposite lugs carried by the turret below the platform, a lever pivoted near one end upon the frame, the short arm of the lever having a roller to engage one of the lugs and stop the turret, a vertically movable latch having rollers for engaging the long arm of the lever, said latch having an arm extending beneath the frame, and means connecting the depressible platform to the latch to lower the same and release the said lever and permit the turret to revolve.

8. A rat killing device comprising a frame, a depressible platform mounted above the frame, a turret rotatably mounted on the frame and extending through the center of the platform, rat-killing wings carried by the turret above the platform, a spiral spring mounted within the turret so as to cause the same to rotate in one direction, said spring being wound around and secured to an arbor, a ratchet and pawl for holding the arbor, opposite lugs carried by the turret below the platform, a lever pivoted near one end upon the frame, the short arm of the lever having a roller to engage one of the lugs and stop the turret, a vertically movable latch having rollers for engaging the long arm of the lever, said latch having an arm extending beneath the frame, opposite plungers mounted in the frame with their upper ends abutting the platform, a series of levers fulcrumed beneath the frame and connecting the lower ends of the plungers to the said arm of the latch to depress the latter and release the stopping lever, and a spring for returning the levers, latch and plungers to normal position when weight is removed from the platform.

9. A rat killing device comprising a frame, a depressible platform mounted above the same, a rotatable turret extending through the center of the platform and having impact wings, a spring for rotating the turret, diametrically opposite radial lugs carried by the turret below the platform, an intermediately fulcrumed lever having one arm normally in the path of the lugs and adapted to stop the turret, means operable by the platform when depressed for releasing the lever and permit the same to swing out of stopping relation to the engaged lug, and a slidable bar mounted in the frame and adapted to be actuated by the opposite lug to push the said lever again into position to stop the last-named lug.

10. A rat killing device comprising a frame, a depressible platform mounted above the same, a rotatable turret extending through the center of the platform and having impact wings, a spring for rotating the turret, diametrically opposite radial lugs carried by the turret below the platform, an intermediately fulcrumed lever having one arm normally in the path of the lugs and adapted to stop the turret, means operable by the platform when depressed for releasing the lever and permit the same to swing out of stopping relation to the engaged lug, a slidable bar mounted on the frame in line with the stop lever and having a tooth in position to be engaged by the lug opposite to the lug released by said stop lever to rock the latter into lug engaging position again, and a spring for returning said slidable bar to normal position.

In testimony that I claim the foregoing as my own, I have hereto affixed my signature.

BERNHARD ERNST FISCHER.